(12) United States Patent
Hur

(10) Patent No.: US 7,181,620 B1
(45) Date of Patent: Feb. 20, 2007

(54) METHOD AND APPARATUS PROVIDING SECURE INITIALIZATION OF NETWORK DEVICES USING A CRYPTOGRAPHIC KEY DISTRIBUTION APPROACH

(75) Inventor: Matthew Hur, North Bend, WA (US)

(73) Assignee: Cisco Technology, Inc., San Jose, CA (US)

( * ) Notice: Subject to any disclaimer, the term of this patent is extended or adjusted under 35 U.S.C. 154(b) by 785 days.

(21) Appl. No.: 10/008,053

(22) Filed: Nov. 9, 2001

(51) Int. Cl.
*H04L 9/00* (2006.01)
*H04L 9/08* (2006.01)

(52) U.S. Cl. ..................................... 713/171; 713/168
(58) Field of Classification Search ............... 713/171, 713/168
See application file for complete search history.

(56) References Cited

U.S. PATENT DOCUMENTS

| | | | | |
|---|---|---|---|---|
| 5,737,419 | A | * | 4/1998 | Ganesan ..................... 713/169 |
| 6,198,824 | B1 | * | 3/2001 | Shambroom ................ 380/279 |
| 6,718,467 | B1 | * | 4/2004 | Trostle ....................... 713/171 |
| 2001/0047484 | A1 | * | 11/2001 | Medvinsky et al. ........ 713/201 |
| 2002/0147906 | A1 | * | 10/2002 | Lotspiech et al. ......... 713/158 |
| 2005/0027985 | A1 | * | 2/2005 | Sprunk et al. ............. 713/171 |

FOREIGN PATENT DOCUMENTS

WO    WO 99/17495    *  4/1999

OTHER PUBLICATIONS

Bruce Schneier, "Applied Cryptography", 1996, pp. 566-572.*
J. Trostle, et al., "Lightweight Kerberos Mechanism", Nov. 2000, 5 pages.
Brian Tung, et al., "Public Key Cryptography for Intial Authentication in Kerberos", Dec. 15, 2001, 20 pages.
Mike Swift, et al., "Extending the GSS Kerberos Mechanism for Initial Kerberos Authentication (IAKERB)", Jul. 2001, pp. 1-9.
Kohl, "The Kerberos Network Authentication Service (V5)", 1993, 106 pages.
Bruce Schneier, "Applied Cryptography", 1996, pp. 566-572.

* cited by examiner

*Primary Examiner*—Nasser Moazzami
*Assistant Examiner*—Eleni Shiferaw
(74) *Attorney, Agent, or Firm*—Hickman Palermo Truong & Becker LLP

(57) ABSTRACT

Registration of non-configured network devices in a distributed network is facilitated by a method of distributing cryptographic keys. A non-configured first device seeking to communicate securely with a second device acquires knowledge of a trusted registration service. The first device registers with the registration service and obtains a longer-lived symmetric key. Using the longer-lived key, the first device authenticates itself to a key management service, and receives a shorter-lived symmetric key encapsulated in a ticket that includes policy information. A second device carries out the same preparatory process. Using its ticket containing the shorter-lived key, the first device requests the second device to obtain a session key on behalf of both. The second device presents its own ticket and that of the first device to the key management service to authenticate the shorter-lived key, and then obtains a session key for use in communications among the first and second devices. The first device and second device then communicate by encrypting communications with the session key, and without further contact with the key management or registration services or any other online authoritative server or key database. Thus newly deployed network devices may be positively identified, registered in the network, and subjected to key schedule or other key management policies.

42 Claims, 7 Drawing Sheets

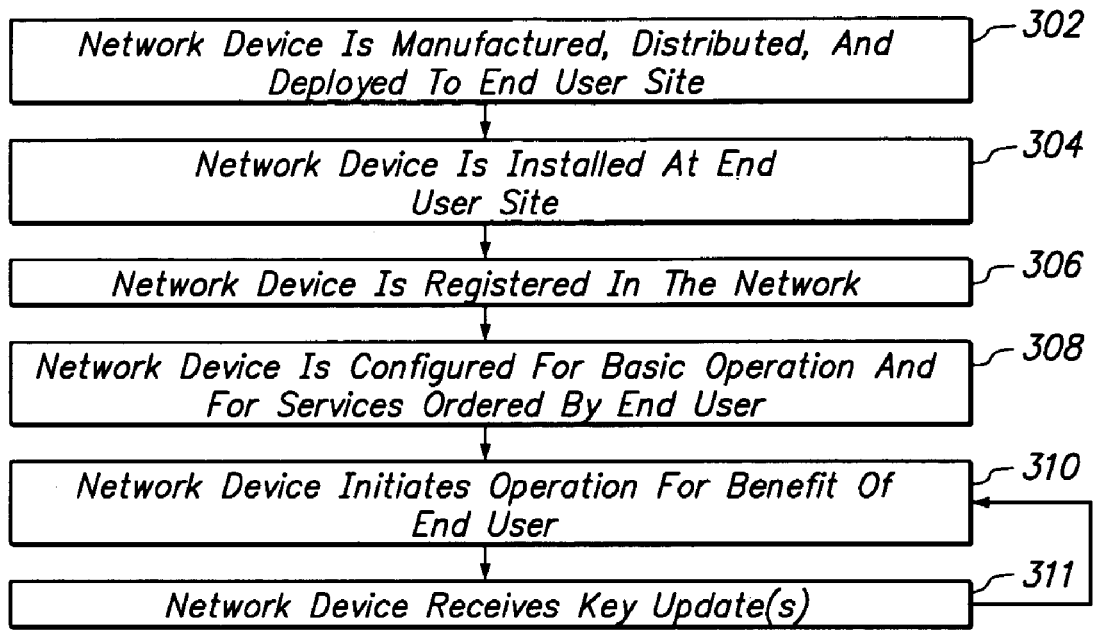
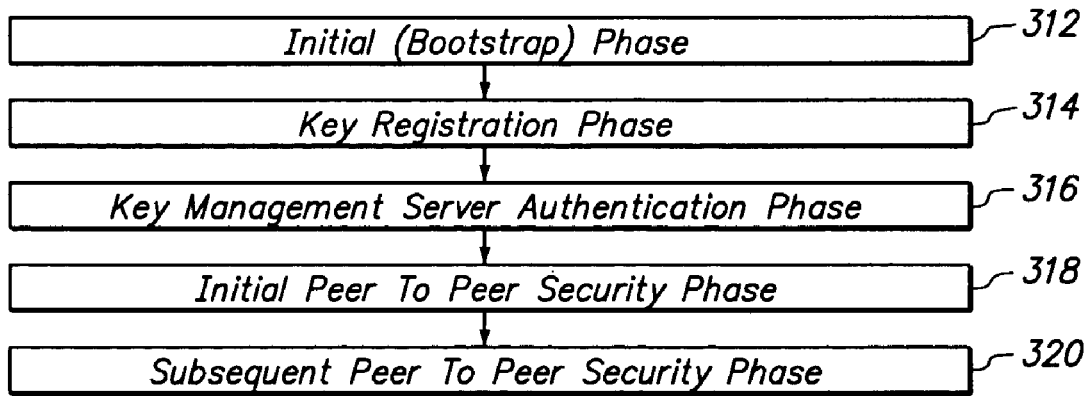

METHOD AND APPARATUS PROVIDING SECURE INITIALIZATION OF NETWORK DEVICES USING A CRYPTOGRAPHIC KEY DISTRIBUTION APPROACH

FIELD OF THE INVENTION

The present invention generally relates to security aspects of initializing network devices that are newly deployed in a network, using computer-based cryptography approaches. The invention relates more specifically to a method and apparatus for distributing cryptographic keys in a network useful for improving registration and bootstrapping of network devices.

BACKGROUND OF THE INVENTION

Deployment of network devices such as residential gateways, routers, cable modems, and other devices presents problems with respect to initial registration, configuration, and bootstrapping of the devices in a distributed network. Network service providers and their customers desire to have a way to rapidly deploy numerous network devices with minimal pre-configuration, and to have a way to efficiently register the devices in the network once they are deployed, with minimal customer involvement. For example, in large packet cable networks that include consumer-grade cable modems, there is a need to deploy the devices rapidly and register them in the network upon installation at the customer premises, without requiring the customer to have technical knowledge or carry out complicated registration steps.

A related problem, in this context, involves how to securely register a device so that only authorized devices are registered in the network. There is a specific need for a reliable and secure way to positively identify a newly deployed device as authorized to register in the network. Thus, there is a need for a rapid, efficient, and simple way to establish a secure communication channel between a newly deployed network device and the network itself.

A more specific problem in this context relates to password management. While it is desirable to have a communication channel between the newly deployed network device and the network that is secured using encryption, it is undesirable to require the customer to enter a password or manage the updating and use of passwords. Distribution of passwords, in particular, is troublesome. It is also impractical to require the customer to manage policy issues such as when passwords or keys expire, scheduling distribution of replacement keys, or configuration of new keys for new services provided to an existing network device. Therefore, there is a need for a scalable approach for distribution of new passwords or keys to network devices that are deployed in a distributed network.

In a distributed network that uses secure communications, network nodes that initiate or manage the secure communications are termed "principals." Such security principals may be software processes, computers, elements of network infrastructure, etc. Achieving secure communications among principals in a distributed network requires a process of key management and distribution, and the ability to associate a key with a principal. Two primary technologies may be used to accomplish these objectives: public key (or asymmetric key) technology and symmetric key (or shared key) technology. Typically, these systems are associated with security infrastructure elements based on digital certificates that are generated based on exchanges of public keys (a "public key infrastructure" or "PKI"), or based on a Kerberos infrastructure. Each of these systems had distinct disadvantages. It would be desirable to have a system that could leverage their strengths while mitigating their weaknesses.

In general, a trusted third party can provide a mechanism for scalable trust management within a network security system. Both public key certificate-based systems and Kerberos-based systems use a trusted third party. In particular, a PKI requires trust in a Certification Authority (CA), and Kerberos requires trust in a Key Distribution Center (KDC). In either case, compromise of the trusted third party is catastrophic to the security infrastructure.

However, CAs and KDCs are ideologically different. In PKI, only the user is supposed to know the user's private key. Ideally, in a PKI transaction, there is no online third party involved; authentication is performed end to end. Additionally, store and forward types of applications can take advantage of the fact that an online third party is not required for authentication. Kerberos, however, assumes that the trusted authority is always online.

Both a CA and a KDC have a single point of failure in the form of a master key. For a CA, the master key is the private key used for signing certificates. For the KDC, the master key is the symmetric key used for encrypting the principal database. If a CA is compromised, then an attacker may impersonate a user by signing his own certificate with the compromised key. If a KDC is compromised, then the attacker may impersonate a user within the KDC's realm by using that user's symmetric key that was stored in the principal database.

A PKI uses asymmetric or public key cryptography for identity management. The term "asymmetric" is used, because of the application of two inverse keys comprising a public and a private key. These keys are termed inverse because one key is used to decrypt what the other key encrypts. In contrast, with a symmetric or shared key, the same key is used for encryption and decryption. A public key is a key that is publicly known. A private key is known to only one individual, in contrast to a secret key, which is shared. Further more information on symmetric and asymmetric cryptography appears in B. Schneier, "Applied Cryptography" (New York: John Wiley & Sons, 2d ed. 1996). A brief overview of pertinent concepts is provided herein.

A PKI establishes the identity of a principal by binding the name of the principal to a public key. In this context, the name of a principal may be a distinguished name ("DN") as defined in the International Telecommunications Union (ITU) X.500 standard. This binding occurs in a data construct called a certificate. Since there is only one private key associated with a public key, and that private key is known to only one entity, certain important operations may be carried out based on an assurance that the public key is bound to a particular principal. For example, a principal can authenticate itself by proving knowledge of the private key associated with the public key, for example, by encrypting something that can be verified by the public key. The encrypted information is known as a digital signature, and it can be created because the private key is known to only the principal whose DN is bound in the certificate. Furthermore, a confidential message can be sent to a principal by encrypting the message in the public key found in that principal's certificate. Only the bearer of the associated private key may then decrypt the message.

However, an open issue with public key certificates is how one can know that a certificate is valid. For example, assume that A presents a certificate that contains person B's name associated with A's public key. This would allow A to impersonate B, which is a compromise of security. Use of a CA can address this concern because the CA is the trusted entity in a PKI that binds a name to a public key. When a certificate is issued by the CA, a user may trust that a public key is associated with the correct name of the principal that bears the corresponding private key. The CA digitally signs the certificate to indicate authenticity.

A registration authority (RA) may be involved in the certificate issuance and management process. Typically, an RA is used to improve certificate distribution; for example, it submits requests to the CA. As a specific example, a CA may be run as an outsourced service, with an RA at the consumer premises and having a trust relationship with the remote CA.

Registration of a principal is critical in establishing trust in the resulting certificate. Usually, this is performed by issuing a password, out of band, to a principal that uses the password to register for a certificate.

A remaining issue is how to trust the signature of the CA. Such a signature can be verified by checking the signature against the public key certificate of the CA. However, this process can result an infinite regress in which a party is required to continuously follow a chain of certificates. The issue is addressed by providing a root certification authority that is absolutely trusted. Certificates of the root certification authority are not signed by another CA. An example of a certificate chain is as follows: Suppose that V Company issues a certificate to M Company, which then issues a certificate to a software vendor. This vendor issues a certificate to an application plug-in developer. When a user wishes to install a plug-in into the application that runs on M Company's platform, the user verifies the authenticity of the plug-in by "walking" the certificate chain of the certificate associated with the plug-in. Of course, this can be a problem if an attacker has tricked V Company into issuing a certificate with M Company's name in it.

Still another issue is how to revoke certificates, such as those that have been compromised or inadvertently, for example. In one approach, each certificate is checked by querying a revocation server over a network. In a PKI, a certificate revocation list ("CRL") is provided to enable a system to determine whether a certificate has been revoked.

FIG. 1 is a diagram of a public key infrastructure that uses digital certificates that conform to the ITU X.509 standard and protocols. Client 102 is seeking to communicate using a secure connection 104 to an end service 106; both client 102 and end service 106 are security principals, and must obtain a public key certificate. In one approach, client 102 issues a certificate request 108A to certification authority 110. End service 106 may similarly issue a certificate request 108B to the CA 110. Alternatively, client 102 and end service 106 may respectively issue certificate requests to a registration authority 112, which passes the requests to CA 110 in a pre-defined way. CA 110 may consult directory 114 to obtain or verify DN's of client 102 and end service 106.

Two principals may authenticate and establish secure communications using their public key certificates. For example, the Secure Sockets Layer (SSL) protocol or TLS protocol may be used to authenticate and establish a shared session key that can be used to communicate establish an encrypted channel. Because of the computational burden of carrying out public key exchanges, public key exchange techniques generally are used only to establish a shared, symmetric key, rather for direct encryption of a secure channel. In order to assure that the other principal is trusted, each principal must verify the other's certificate against a CRL, which may be obtained from a directory server 114 (as indicated by CRL 116A, CRL 116B), from CA 110 (as shown by CRL 116C), or through an online revocation service.

FIG. 2 is a diagram of an example Kerberos key management system. Kerberos defines a protocol for authentication and key transport in which a trusted key distribution center ("KDC") 200 issues symmetric key based certificates ("Kerberos tickets") for the purpose of authentication and key establishment. Kerberos principals, such as client 102 and end service 106, share a key with the KDC 200. The KDC 200 is then able to communicate securely with any of its principals. A ticket contains a symmetric key that is encrypted under the key shared by a principal and the KDC 200. It binds the name of the requestor or client to the key; the recipient or server is implied, since the server's key encrypts the ticket. Therefore, the client and server principals can authenticate by proving knowledge of the key contained within the ticket. A Kerberos "administrative realm" defines a trust boundary. Kerberos is further described in J. Kohl and C. Neuman, "The Kerberos Network Authentication Service (V5)", RFC 1510, September 1993, and "Kerberos: An Authentication Service for Computer Networks", B. C. Neuman, T. Ts'o, IEEE Communications, 32(9):33–38, September 1994.

In the Kerberos protocol, several data exchanges are carried out, as shown in FIG. 2. First, an initial authentication server exchange 201 is carried out when the client 102 initially authenticates to the KDC 200. Client 102 issues a request 204 for authentication. This authentication may be based on a password (converted to a key), a token card, a public key signature, or some combination of these or other mechanisms. The KDC returns a service ticket 206 for either the KDC's ticket-granting server, which is described in the next paragraph, or for an application service.

Second, a ticket granting server exchange 202 is carried out. A ticket granting service (TGS) is a logical construct within the KDC 200 that enables the KDC to issue application service tickets without having to require initial authentication from the client 102. The client 102 authenticates to the TGS by using service ticket 206, as indicated by TGS request 208. The TGS then issues a ticket 212 to the client for an application service.

Third, an application exchange 203 is carried out. Client 102 may use its application service ticket 212 to go directly to the application service 106 without contacting the KDC, as indicated by request 214. Client 102 may do so for the lifetime of the ticket 212.

An X.509 public key infrastructure is beneficial in that it uses digital signatures, and is well suited for store-and-forward applications. It also provides direct, end-to-end authentication without requiring an online trusted third party at the time authentication is carried out. However, PKI schemes also have significant disadvantages. For example, complicated administration issues exist. Creation and distribution of key pairs is not trivial, and managing certificate lifetimes is not simple. A PKI may have varying policies for how long old certificates are honored; this may imply that a user will have a key for signing and a shorter-lived key for authentication and encryption, which adds a layer of complexity. Management of certificate revocation lists must be addressed, possibly requiring an online server.

Still other issues relate to how to provide secure storage of private keys. Use of smart cards or token cards, locally encrypted storage, a directory server, or removable media may be required, and there is no industry agreement on the foregoing. Computational efficiency of public key operations is a significant issue, as it is widely known that for keys of comparable strength, public key operations are on the order of 1,000 times slower than conventional symmetric key encryption operations.

Yet another challenge is state management. Public key network communications protocols, such as SSL and IKE, require both clients and servers to maintain state. The problem of following certification chains, in which a root certificate authority is absolutely trusted, is not entirely satisfactory. There are no well agreed-upon, deployed ways to carry out distributed certificate-related policies, such as authorization information. If the certificate contains authorization information, then there may be issues with re-issuing keys, re-certifying public keys, and revoking certificates Kerberos has the advantage of offering central administration of principals, and it is known to be scalable via replication. Further, Kerberos tickets can carry authorization information, have an assignable lifetime, provide a mechanism to maintain state (security context) in a sessionless protocol, without placing a burden on the server, and use short-lived credentials. However, Kerberos also has certain clear disadvantages. In general, it is known as best suited for use in the Intranet context rather than for securing Internet traffic. It requires a central, online third party for authentication; a client cannot access the end service if the KDC is busy, down or unavailable. It requires a database of shared secrets, which may introduce scalability issues as the database grows in size. Replication of such databases to multiple distributed locations is complex and error-prone. It does not provide digital signatures or a mechanism for non-repudiation of communications. Cross-realm authentication is complicated to carry out.

An X.509 PKI has the advantage of widespread acceptance in Internet applications, and the ready availability of commercial X.509 solutions and trusted CAs. An advantage of Kerberos is that it is supported by products of Microsoft Corporation, such as in the Windows 2000 operating system, which has gained wide acceptance in the enterprise computing market. However, a weakness of Kerberos is a lack of acceptance outside the Microsoft environment, and the existence of relatively few commercial grade implementations.

Thus, there is a need for a way to provide secure key distribution in a manner that offers interoperability among different systems and high performance. There is a need for a system that has greater scalability than a Kerberos system and less administrative costs than a PKI system. There is also a need for a system that is equally useful for inter-network communication and intra-network communication.

Based on the foregoing, there is a clear need for an improved method to distribute keys for use in establishing secure communications that achieves the advantages set forth above without the disadvantages described above.

Further, to provide a registration and bootstrap mechanism that is highly automated, there is a need for a way to authenticate a device and registration service. Because this in turn requires a way to carry out initial authentication, a form of keying is needed, and as a result there is a need to minimize the amount of effort to do such initial staging.

There is also a need to be able to deploy devices in a distributed fashion; while the attributes of a public key system can be used, there is also a need to mange devices centrally, and therefore there is a need to use an approach having the attributes of Kerberos.

There is also a need for a system that does not require propagation of large databases of keys, for example, using enhancements to Kerberos. There is a need to either eliminate or minimize the amount of data that is propagated, without placing fixed keys on devices. There is also a need for a way to apply a centralized policy to carry out key schedule.

There is still a further need for a way to have consistency in the security infrastructure that is used for managing the devices, so that the same security infrastructure can be applied to later uses.

SUMMARY OF THE INVENTION

The foregoing needs, and other needs and objects that will become apparent for the following description, are achieved in the present invention, which comprises, in one aspect, a method and apparatus providing secure initialization of network devices using a cryptographic key distribution approach.

In one embodiment, a first device that wishes to communicate securely with a second device carries out an initial processing phase in which the first device acquires knowledge of a trusted authority or registration service. The first device then registers with the registration service and obtains a longer-lived symmetric key. Using the longer-lived symmetric key, the first device authenticates itself to a key management service, and receives a shorter-lived symmetric key encapsulated in a ticket that includes a specified lifetime or other policy information. A second device carries out the same preparatory process.

Using its ticket containing the shorter-lived symmetric key, the first device requests the second device to obtain a session key on behalf of both devices. The second device presents its own ticket and that of the first device to the key management service to authenticate the shorter-lived symmetric key, and then obtains a symmetric session key for use in communications among the first and second devices. The first device and second device may then communicate by encrypting and decrypting their communications with the symmetric session key, and without further contact with the key management service or registration service, and without any other online authoritative server or key database.

In this arrangement, secure communication is efficiently established among peers without extensive use of the computationally expensive public key operations found in public key infrastructure implementations. Further, the disclosed approach is operable without large, replicated databases of private keys that are required to be constantly online, as required in implementations of the Kerberos protocol.

In other aspects, the invention encompasses a computer apparatus, a computer readable medium, and a carrier wave configured to carry out the foregoing steps.

The approaches described herein provide a better system for managing devices securely, both during initial registration of newly deployed devices and during implementation of policy decisions. The approaches are applicable, for example, to any multimedia terminal adapter, network routers or gateways, etc.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram of a process of deploying a network device;

FIG. 3B is a flow diagram of a process of providing key management in a network;

DETAILED DESCRIPTION OF THE PREFERRED EMBODIMENT

Figure 1:
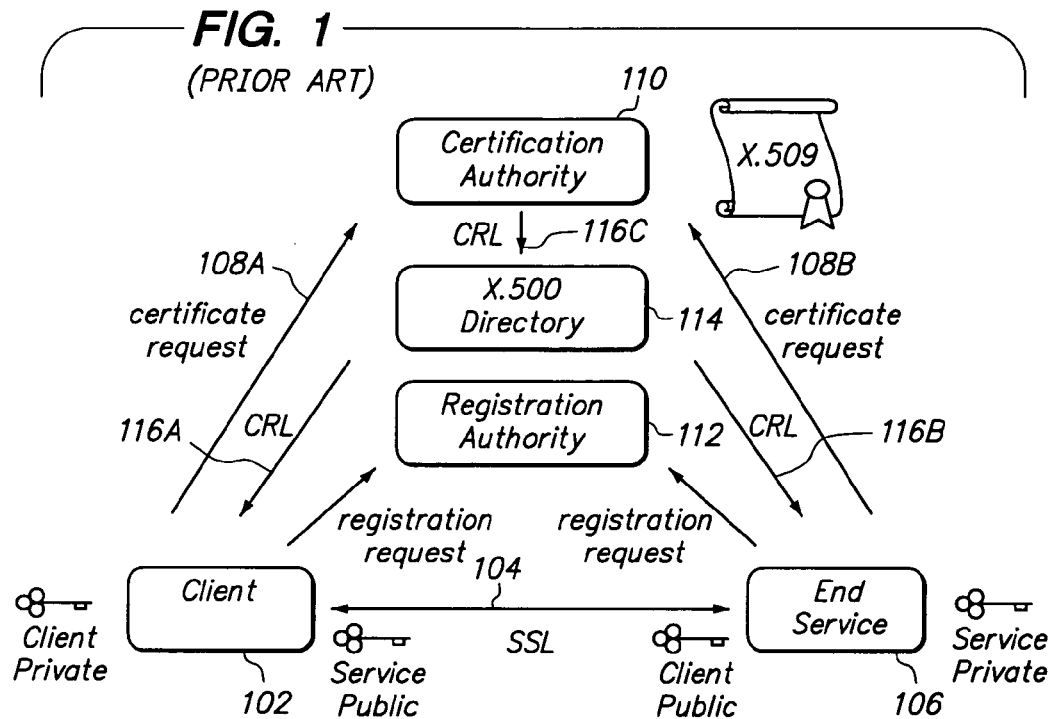
FIG. 1 is a block diagram of a public key infrastructure that uses digital certificates that conform to the ITU X.509 standard and protocols.
Figure 2:
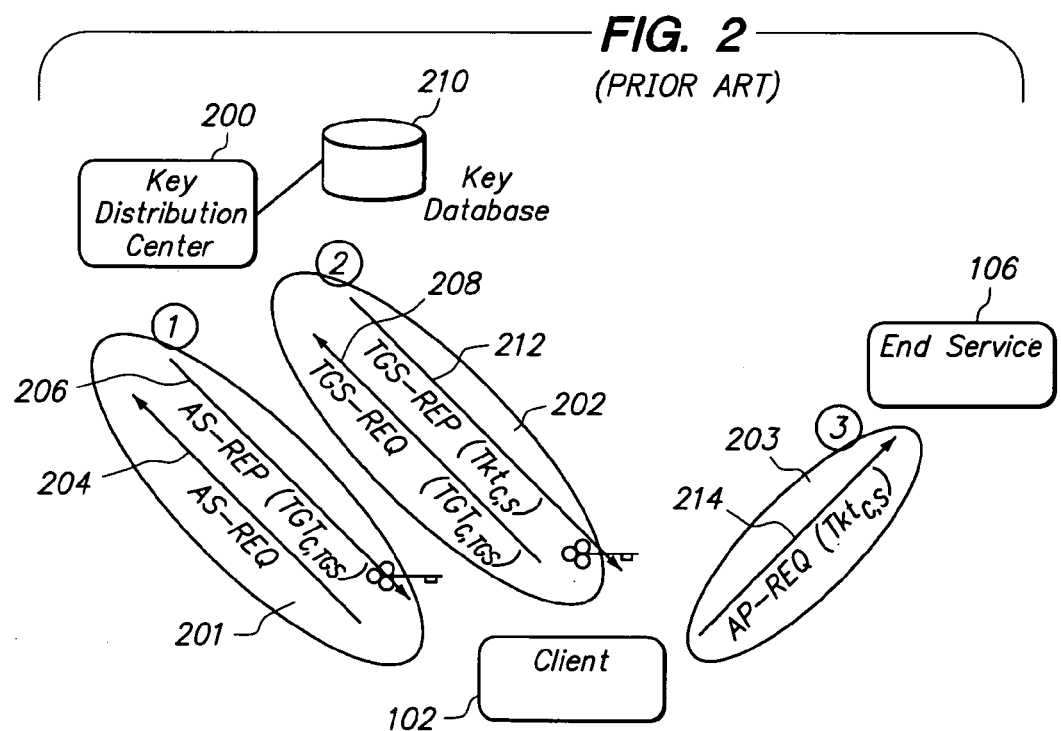
FIG. 2 is a block diagram of an example Kerberos key management system.

A method and apparatus providing secure initialization of network devices using a cryptographic key distribution approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

1.0 FUNCTIONAL OVERVIEW
2.0 FUNCTIONAL DETAILS OF KEY DISTRIBUTION PROCESS
  2.1 INITIAL BOOTSTRAP PHASE
  2.2 KEY REGISTRATION PHASE
  2.3 KEY MANAGEMENT SERVER AUTHENTICATION PHASE
  2.4 INITIAL PEER-TO-PEER AUTHENTICATION PHASE
  2.5 SUBSEQUENT PEER-TO-PEER AUTHENTICATION PHASE
3.0 GROUP KEYING AND OTHER EXTENSIONS
4.0 HARDWARE OVERVIEW
5.0 EXTENSIONS AND ALTERNATIVES 1.0 Functional Overview According to one embodiment, a key management infrastructure is provided that overcomes issues of prior approaches to key management in distributed systems. A method of distributing cryptographic keys in a computer network is provided, in which a first device that wishes to communicate securely with a second device carries out an initial processing phase in which the first device acquires knowledge of a trusted authority or registration service. The first device then registers with the registration service and obtains a longer-lived symmetric key. Using the longer-lived symmetric key, the first device authenticates itself to a key management service, and receives a shorter-lived symmetric key encapsulated in a ticket that includes a specified lifetime or other policy information. A second device carries out the same preparatory process. Using its ticket containing the shorter-lived symmetric key, the first device requests the second device to obtain a session key on behalf of both devices. The second device presents its own ticket and that of the first device to the key management service to authenticate the shorter-lived symmetric key, and then obtains a symmetric session key for use in communications among the first and second devices. The first device and second device may then communicate by encrypting and decrypting their communications with the symmetric session key, and without further contact with the key management service or registration service, and without any other online authoritative server or key database.

Using the approaches herein, a registration node of a network, or other authoritative node, is able to positively identify devices that are deployed in the network for purposes of providing keys for initial device registration, updating expired keys, managing key schedule, deployment of new services, and other functions.

The disclosed system takes into account numerous factors, including: computational cost and burden on the system; network traffic requirements (increased number of round trips); too much centralization, thus diminishing the benefits of a distributed system; pushing too much state into the distributed entities; centralization of policy (such as key schedule) without placing too harsh a burden on the entities or on the network; minimize requiring the entities to have much intelligence (like store state or make policy decisions); and upfront cost to users or customers.

The disclosed system is directed toward minimizing the use of public key operations, to enable more predictable computational cost; minimizing or removing the need for propagation or replication of sensitive data (symmetric keys); enabling centralized administration of security policy; creating a centrally controlled mechanism for enforcing key schedule; minimizing or eliminating the need for servers to maintain state; enabling a centralized and scalable mechanism for distributing authorization data such as capabilities and group or role affiliations; minimizing security server size and cost in order to enable ease of wide scale deployment.

The disclosed system has numerous practical applications. For example, the system may be used to provide distributed key management for secure configuration or provisioning of network devices (for initial, "no-touch" deployment and continued management). The approaches are applicable, for example, to any multimedia terminal adapter, network routers or gateways, etc., or devices in a distributed enterprise where there is a distribution point and large numbers of network elements. The system can provide group key servers for enabling multicast or group key security. Embodiments are useful in key management establishing IPSec keys, thereby replacing pre-shared keys. The system is also usable for any application that requires pre-shared keys, such as SNMPv3, TACACS, etc.

The disclosed system is also usable in any application that specifies Kerberos as an acceptable or required key management method. For example, the PacketCable specification, 802.1x standard, etc., may use the disclosed system. A further benefit is that the registration service that is described herein provides a mechanism for checking licensing compliance. These applications may be useful in the fields of multicasting audio or video signals over a packet-switched data network, processing voice over Internet Protocol networks, etc.

FIG. 3A is a flow diagram of a process of deploying a network device. FIG. 3A is provided for the purpose of illustrating an operational context in which embodiments of the invention may be used. In block 302, a network device is manufactured, distributed, and deployed to an end user site. Block 302 represents numerous steps involved in manufacturing a new network device, distributing it in the chain of distribution, and deploying or shipping it to an end user location. The end user location may be a work site associated with a business enterprise, a residence, or any other location of use.

In block 304, the network device is installed at the end user site. Block 304 represents steps involved in receiving the device at the end user location, placing it in a physical location that has been selected for use, applying power, and making a physical connection to a network connection point.

In block 306, the device is registered in the network. Registration involves establishing a physical and logical communication link from the device to an authoritative node, such as a registration server; positively identifying the device; determining what authorization is applicable to the device; establishing a secure communication channel with the device; potentially providing the network device with information sufficient to enable the device to carry out a bootstrap load of an operating system and associated software; and providing the device with one or more keys for use in subsequent secure communications with the authoritative node or with peer devices. Embodiments of the invention are concerned with facilitating steps of block 306.

In block 308, the network device is configured for basic operation, and for one or more services that have been ordered by the end user. Block 308 represents steps involved in downloading configuration data to the network device or otherwise providing the network device with persistently stored configuration information about basic network parameters as well as specific services that have been ordered by or on behalf of the end user.

In block 310, the network device initiates operation for the benefit of the end user. Thus, after configuration, the device is used in the ordinary course by the user for communications over the network.

In block 311, the network device receives one or more key updates. Block 311 represents steps involved in implementing key schedule, implementing key expiration and updating policies, etc. Embodiments of the invention are also concerned with facilitating steps involved in block 311.

Thus, embodiments described herein are generally directed toward facilitating security aspects of steps involved in registration and bootstrapping of network devices. Using the disclosed approaches, an enterprise can deploy network devices more rapidly. Devices that are shipped as part of block 302 may have only minimal configuration information, and users who receive devices at block 304 do not need to know how to configure the devices. Embodiments may be used to facilitate registration of devices; establishing initial keys; and addressing key schedule. Embodiments enable an authoritative node to identify a non-configured device positively, establish secure communication with the un-configured device, and manage keys, key schedule, new services, and other aspects of the device thereafter.

FIG. 3B is a flow diagram of a process of providing key management in a network. In general, embodiments provide key management in a plurality of processing phases. In block 312, a security principal or other device that is participating in a network carries out an initial phase (or "bootstrap" phase) in which it acquires basic information about an administrative entity that it can trust. An example of an administrative entity is a registration server. Further, the administrative entity discovers basic identifying information about the participating device or principal.

Normally a device carries out the initial phase only once. For example, the initial phase may be carried out as part of a one-time configuration step that is carried out by a party who is installing the device or shipping the device to a user. As a non-limiting specific example, the device could be a cable modem that is drop-shipped by a manufacturer and which is then configured with an IP address of a registration server and a public key associated with the cable modem.

In block 314, a key registration phase is carried out. In key registration, a device is established as a principal within an operator's administrative realm. In this process, a long-lived symmetric device key is established as a realm key for the device. The realm key authenticates the device as a member of the operator's realm. A device may carry out the key registration phase any number of times, but in practice it is expected that the device will carry out the key registration phase only periodically over a relatively long time interval, e.g., once upon booting up or initiating operation, once a day, etc. The key registration phase may use public key authentication processes, which are known to be relatively computationally inefficient, but once a trust relationship is established between the device the operator's administrative realm, no further public key operations are needed, as described herein.

In block 316, a key management server authentication phase is carried out. In general, after a device has a long-lived device key, it may contact a distributed key management service in order to obtain a shorter-lived key that is used for sessions for a specified period of time. A device may carry out such authentication and obtain a shorter-lived key at any convenient time interval.

In block 318, an initial peer-to-peer authentication phase is carried out. A session key is established between two peers. The session key enables the peers to mutually authenticate. Furthermore, after the peers establish a session key, the peers may reuse the session key for future communication. Typically each peer carries out the initial peer-to-peer authentication phase once for each communication session of a particular peer with another specific peer. Thus, a particular peer may carry out the initial peer-to-peer authentication phase once per hour, once per day, etc., or for any number of times for the same peer over a particular span of time, as communication sessions are needed.

In block 320, a subsequent peer-to-peer authentication phase is carried out. The subsequent peer-to-peer authentication phase is carried out at the outset of a session, whenever peers need to communicate in that particular session.

Each of the foregoing phases is now described in detail.

2.0 Functional Details of Key Distribution Process 2.1 Initial (Bootstrap) Phase In one embodiment, each device or principal that participates in the key management system carries out an initial phase or bootstrap procedure. During the bootstrap phase, the device receives information identifying at least one trusted administrative entity or registration service. This information may be termed a Registration Service Identifier. Further, the administrative entity that is known to the device, or registration service, receives information enabling it to identify the device. This information may be termed a Device Identifier. Alternatively, the administrative entity may rely on device identifying information that is stored in a trusted repository, such as a directory server.

In addition to the foregoing steps, in the initial phase the device optionally carries out a security staging sub-phase using one of three alternative mechanisms.

Figure 4A:
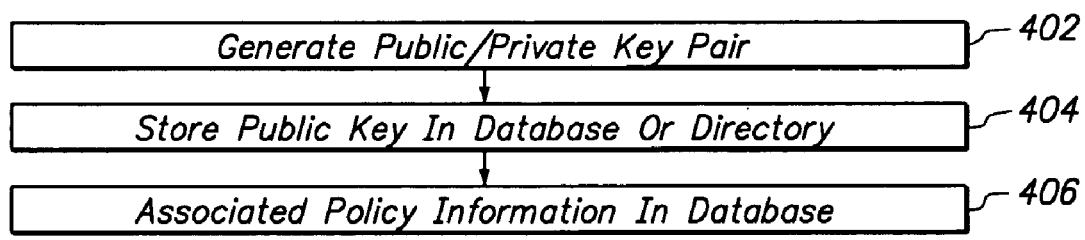
FIG. 4A is a flow diagram of a first alternative for a security staging sub-phase.

FIG. 4A is a flow diagram of a first alternative for a security-staging sub-phase. In block 402, a communicating device generates a key pair comprising a public key and a private key. These keys may be termed the Device Public Key and Device Private Key. The specific methodology for generating the key pair is not critical. For example, the Device Private Key could be the mathematical product of two large relatively prime numbers and the public key could be generated based on exponentiation or modular functions. In block 404, the Device Public Key is placed into a registration database or directory. The database or directory is associated with the administrative entity or registration service that is identified by the Registration Service Identifier. In block 406, policy information is associated with the device in the registration database.

In this context, the terms "device" and "peer" are used synonymously and refer to a computer, host, processor, software process or program, or any other software element or hardware element now known or developed hereafter and that is capable of communicating over a network. The peers may be network infrastructure devices such as routers, switches, gateways, etc., or processing devices such as personal computers, workstations, servers, etc., or software elements such as browsers, agents, operating systems, application programs, functions of an application programming interface or dynamic linked library, daemons, etc. The peers may be located at any logical or physical location within one or more local networks, wide area networks, or internetworks.

Figure 4B:
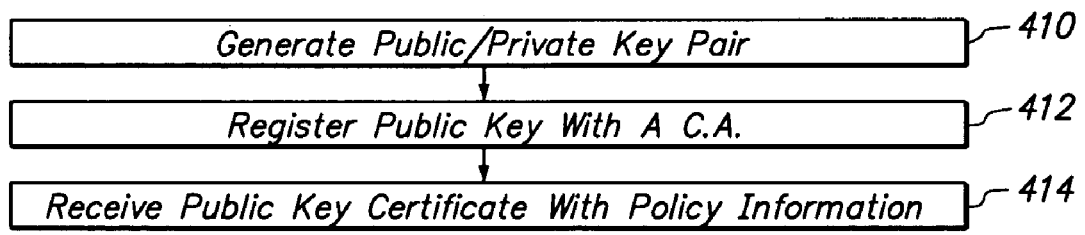
FIG. 4B is a flow diagram of a second alternative for a security staging sub-phase.

FIG. 4B is a flow diagram of a second alternative for a security-staging sub-phase. In block 410, the device generates a public/private key pair, as in block 402. In block 412, the Device Public Key is registered with a certification authority. The certification authority may be a public or commercial certification authority such as that operated by VeriSign. In block 414, the device receives a public key certificate. The public key certificate may be an X.509 certificate, but this is not required. The certificate contains policy information associated with the device, such as an expiration time for other keys that are generated later.

According to a third alternative for a security staging sub-phase, either the first alternative of FIG. 4A or the second alternative of FIG. 4B is used, except that the key generation of block 402 and block 410, respectively, is performed by a separate staging system rather than performed by the device. As a result, the staging system generates a Device Private Key that is provided to the device in a secure manner. For example, the key could be provided to the device through a connection to a serial port of the device. Thereafter, the Device Private Key is stored by the device.

2.2 Key Registration Phase

Key registration refers to a process of establishing a device as a principal within an operator's administrative realm. In one embodiment, a long-lived symmetric device key is established as the device's realm key, and the realm key authenticates the device as a member of the operator's realm. In this context, the operator may be an entity that owns or operates the registration service that is identified by the Registration Service Identifier, and the operator's realm is a security environment as defined by the operator that includes the device.

Figure 5A:
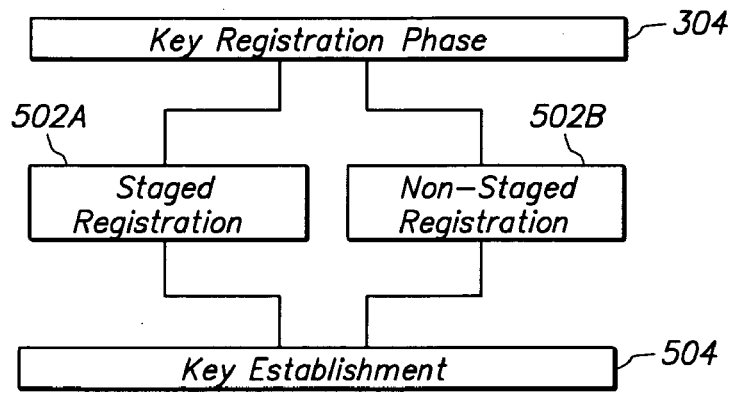
FIG. 5A is a flow diagram of a key registration phase, in one embodiment.
Figure 5B:
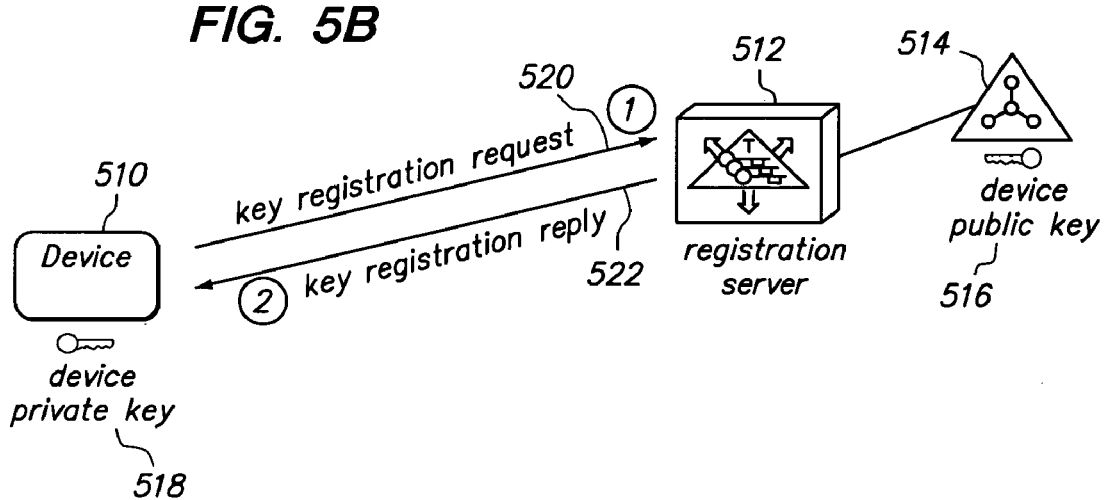
FIG. 5B is a block diagram that illustrates relationships and communications among a device that is registering with a registration server.

FIG. 5A is a flow diagram of a key registration phase, in one embodiment. In general, key registration phase 314 involves carrying out either a staged registration step 502A or a non-staged registration step 502B, followed by a key establishment step 504. FIG. 5B is a block diagram that illustrates example relationships and communications among a device that is registering with a registration server in carrying out such steps.

In staged registration step 502A, prior to registering in the operator's realm, a device 510 generates information that assures the registration server that the device is at least a "certified device." Such information may be termed Device Certification Information. For example, Device Certification Information may indicate that the device 510 was manufactured to some known specification, as is done in PacketCable systems. Staging also may be used to associate a device name with a particular profile that may then be used for configuration or provisioning the device, or with a mechanism for authenticating the registration server 512.

In one approach, device 510 is acknowledged as part of a manufacturing or staging realm through an association of a Device Public Key 516 with a device name, such as a MAC address. This association may be verified by providing it in an X.509 public key certificate. Alternatively, the association may be verified by an entry in a secure database 514 that links the Device Public Key 516 to a name of device 510. For example, a particular manufacturer may be given secure access to a secure database so that when the manufacturer releases a newly manufactured device for shipment to a customer, the manufacturer records an entry in the secure database with Device Public Key 516 and an associated MAC address of device 510. The precise mechanism for carrying out such an association is not critical; what is important is that the registration server is provided with the Device Public Key 516, and stores the Device Public Key in a secure location in association with information identifying the device 510.

As part of staged registration step 502A, device 510 authenticates to the registration server. In one approach, to authenticate itself device 510 sends a message that is encrypted using Device Public Key 516. In this way, the device proves to the registration server that the device knows its Device Private Key 518. Such authentication is represented by arrow 520. Such authentication optionally may use a process similar to PKINIT, which specifies the use of public key credentials to obtain a Kerberos ticket. The Device Public Key 516 is used only for registration and creation of a Device Symmetric Key, as described below, which may be used later to encrypt communications among peer devices within the operator's administrative domain.

In non-staged registration step 502B, a device may register without any previous staging. In this case, a new principal record may be created for the device, and the device can then authenticate within the realm. In one embodiment, the device is unable to be fully configured until some other process takes place to establish a device service profile. For example, if the device is an IP telephone, it may be allowed to use 911 service only, until a subscriber establishes an account profile for other services with a payment mechanism, as is done in systems that conform to the PacketCable specification.

Further, in non-staged registration, there is no way to authenticate the device to the registration server. In one embodiment, the device anonymously connects to the registration server and a protected communication channel is established, for example, using the Diffie-Hellman key establishment approach as described in U.S. Pat. No. 4,200,770. Establishing such a channel is also represented by arrow 520. In this mode of operation, a client profile is established later. This approach may be used, for example, in a set-top box that a user obtains from a retail source.

Key establishment step 504 establishes a long-lived symmetric device key that associates the device 510 with the operator's realm. This key is termed the Symmetric Device Key herein, and is a key that is shared by the device and registration server. A symmetric key, rather than an asymmetric key of the type often used in public/private key exchanges, is used so that subsequent encryption and decryption processes can take advantage of the inherent processing efficiency of symmetric key operations. Additionally, whether a private key or a symmetric key is stored on the device, either key is subject to the same limitations of the device for key protection. Since either type of key is equally susceptible to compromise, using a symmetric key is preferable because of the efficiency of symmetric encryption and decryption operations. Furthermore, since the key will be used in an environment that requires central policy administration, a symmetric key is good choice.

In one key establishment approach, as indicated by arrow 522, registration server 512 provides the Device Symmetric Key 518 to the device 510 in a protected manner. In a first approach, the Device Symmetric Key is encrypted using the Device Public Key 516. Any suitable encryption approach may be used for such encryption, e.g., triple DES, the American Encryption Standard (AES), etc., alone or in combination with a one-way hash function. In another approach, if non-staged registration was carried out, the Device Symmetric Key is encrypted using the key that the device used for non-staged registration. In either approach, policy information, such as key lifetime, etc., is also sent to the device 510. In one embodiment, the policy information and the Device Symmetric Key are encapsulated within a Device Registration Ticket that is sent to the device by the registration server; the ticket is encrypted under the secret key of a key management server 600 that is described further below with reference to FIG. 6. Since the secret key of key management server 600 is a shared secret, device 510 may obtain the shared secret in advance through other means, and therefore can decrypt the Device Registration Ticket.

The Device Registration Ticket carries policy or state information about the Device Symmetric Key, such as key lifetime or other restrictions. Therefore, the key management servers in the network do not need to maintain state information about device 510 or any other participating devices. For example, unlike prior device management approaches, the key management servers do not need to maintain key databases. Because the Device Symmetric Key is long-lived, it should be configured in a way that enhances security; for example, the Device Symmetric Key should be relatively large in length or size, e.g., 4096 bits, or any other size that is considered large or strong at the time that is generated.

Expressed according to Kerberos-style abbreviations, the long-lived symmetric key is $K_{D,RS}$ and is provided as $TKT_{RS}=(\{K_{D,RS}\}\ K_{RS},\ \text{policy data})$. Unlike conventional Kerberos service keys, however, the long-lived key herein is packaged in a ticket to enable the registration server to encapsulate policy data with the key, and thereby enables a device to contact and authenticate with a peer without using a key server that is required to contact a key management database.

2.3 Key Management Server Authentication Phase

In one embodiment, after the device has received Device Symmetric Key for long-term use, it may contact a distributed key management service in order to obtain a shorter-lived key that is used for specific tasks, such as authentication, key agreement, etc., for the lifetime of the short-lived key, as determined by a policy associated with the shorter-lived key. The device is required to authenticate itself to a key management server in order to obtain such a session key. Thereafter, the session key is provided in a ticket that contains policy information. In one embodiment, the ticket provided by the key management service is termed a ticket granting ticket.

Figure 6:
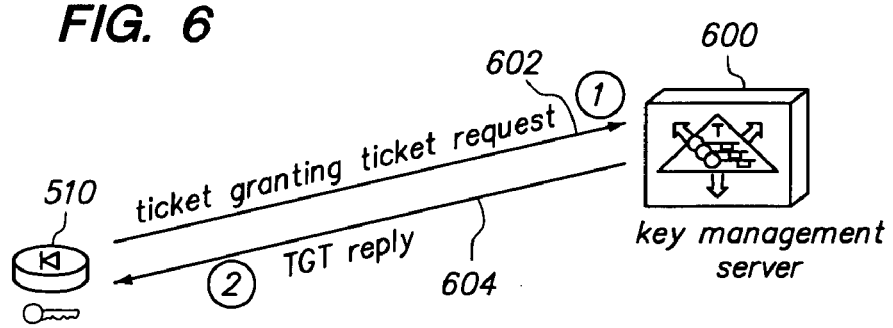
FIG. 6 is a block diagram illustrating communication flow in obtaining a ticket granting ticket, in one embodiment.

FIG. 6 is a block diagram illustrating communication flow in obtaining a ticket granting ticket, in one embodiment. Device 510 issues, to key management server 600, a request for a ticket granting ticket, as indicated by arrow 602. Key management server 600 may be one of a plurality of key management servers that cooperate to form a key management service that is distributed across one or more wide area networks or inter-networks.

As part of making the request, device 510 authenticates itself to key management server 600. For example, device 510 and key management server 600 carry out symmetric key authentication using the Device Symmetric Key $K_{D,RS}$. To facilitate this, Device 510 may authenticate itself by providing the Device Registration Ticket that it received from the registration server to the key management server 600. In response to receiving the Device Registration Ticket, the key management server 600 may authenticate the key and also validate the policy information that is encapsulated in the Device Registration Ticket, for example, to ensure that the Device Symmetric Key is valid or unexpired.

Upon successful authentication, key management server 600 provides device 510 with a short-lived symmetric key, termed a Short-Term Device Symmetric Key. In one embodiment, the key management server 600 encapsulates the Short-Term Device Symmetric Key in a Short-Term Ticket Granting Ticket with associated policy information. The Short-Term Ticket Granting Ticket is encrypted using the secret key of the key management server 600.

The key in the ticket granting ticket may be designated $K_{D,TGS}$, and the ticket is $TGT_{TGS}=(\{K_{D,TGS}\}\ K_{TGS},\ \text{policy data})$. In an embodiment, a Kerberos message exchange may be used to carry out the key management server authentication phase.

Any appropriate lifetime or term may be selected for the Device Symmetric Key and for the Short-Term Device Symmetric Key. A short term is preferred in order to limit the amount of time in which the key potentially may be compromised. In an embodiment, however, the lifetime or valid term of the Short-Term Device Symmetric Key is shorter than that of the longer-lived Device Symmetric Key.

2.4 Initial Peer-to-Peer Security

After obtaining the Session Ticket Granting Ticket, device 510 may set up secure communications with another peer device without further interaction with the registration server or the key management service. In an embodiment, such communications are set up using an initial peer-to-peer security phase and a subsequent peer-to-peer security phase.

Initial peer-to-peer security phase 318 establishes a Session Key between two peers in a network, such as two devices 510. The Session Key enables the peers to mutually authenticate. Furthermore, after the peers establish a Session Key, they may reuse it for future communication, subject to any restrictions associated with the Session Key, such as lifetime. As one example, the initial peer-to-peer security phase could be used to establish a key for use in encrypting a flow of packets among peer routers in a packet-switched network under the IPSec protocol. Alternatively, the system may be used to set up shared keys for use in SNMPv3 communications, TACACS communications, or any other protocol that calls for a shared key. Further, the initial peer-to-peer security phase 318 may be configured using the Kerberos Internet Negotiation of Keys (KINK) protocol as defined in the document "draft-ietf-kink-kink-00.txt." These embodiments then enable a two-message exchange for generating keys for IPSec security associations, as opposed to a six-message exchange as required using Internet Key Exchange (IKE) protocols.

When initial peer-to-peer security phase 318 is entered, both peers are assumed to have Ticket Granting Tickets, such as the Short-Term Ticket Granting Tickets that are obtained as part of the key management server authentication process described above with respect to FIG. 6. Alternatively, obtaining a Ticket Granting Ticket could be delayed until the Ticket Granting Ticket is actually needed as part of phase 318. Each device 510 in a pair of peers may obtain its Ticket Granting Ticket from a different key management server at a different time relative to the other peer device.

Since the key management server 600 does not maintain a key database, the key management server does not know the Short-Term Device Symmetric Key associated each device 510, or any other key associated therewith. However, the Short-Term Device Symmetric Key for each device is contained in the Short-Term Ticket Granting Ticket of that device. Therefore, the peer devices can authenticate to one another by providing their respective Short-Term Device Symmetric Keys to the key management server for authentication, encapsulated in their respective Short-Term Ticket Granting Tickets. Once such authentication is established, later communications may proceed without either peer contacting an online key management server, key distribution center, or other authoritative service at the time that secure peer-to-peer communications are needed.

In one embodiment, a Kerberos user-to-user mechanism is used to carry out peer-to-peer authentication using the Short-Term Device Symmetric Keys. Kerberos user-to-user mode means that a service ticket for a principal, "P," is encrypted in P's ticket granting ticket rather than in the key that P shares with a key distribution center.

Figure 7:
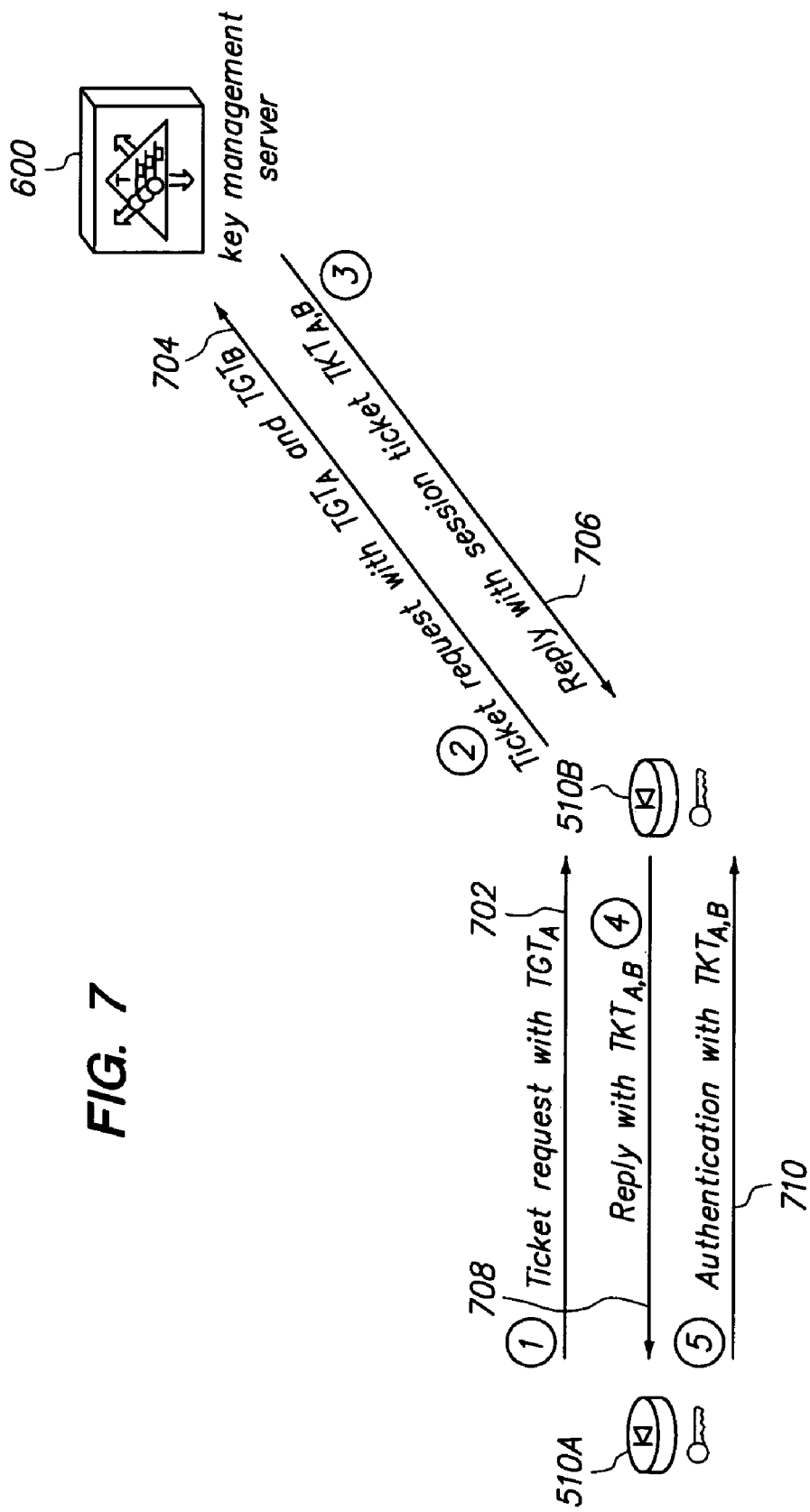
FIG. 7 is a diagram of communication flows that may be used to carry out an initial peer-to-peer exchange, in one embodiment.

FIG. 7 is a diagram of communication flows that may be used to carry out an initial peer-to-peer exchange, in one embodiment. A hypothetical communication network, as illustrated in the example of FIG. 7, includes peer devices 510A, 510B that are communicatively coupled to one another, and a key management server 600 that is communicatively coupled to one of the peers, e.g., to device 510B.

Device 510A requests a ticket for device 510B from the KMS 600, as indicated by first arrow 702. The request includes the Short-Term Ticket Granting Ticket of device 510A (designated herein as $TGT_A$). Device 510A authenticates the request to the key management server 600 by proving knowledge of the secret key that is shared among the key management server and device 510A ($K_{A,KMS}$) that is encrypted within the ticket granting ticket of device 510A ($TGT_A$).

In one embodiment, knowledge of the secret key is proved by encrypting a timestamp value with the shared secret key. The timestamp value may also be used to assert freshness, for example, by requiring the timestamp value to be within a specified interval from the then-current time as shown by the clock of the key management server 600. Key management server 600 may decrypt the timestamp value and validate it against the then-current time and the interval value. Key management server 600 may also cache the timestamp value to guard against a replay attack by ensuring that the same timestamp value is not presented twice by different devices. This approach assumes that the clocks of the device and the key management server are synchronized within a reasonable range of variation. Alternatively, knowledge of the secret key is proved by encrypting a nonce or agreed-upon value.

Device 510B receives the ticket request from device 510A and communicates it to the key management server 600, along with the Short-Term Ticket Granting Ticket of device 510B ($TGT_B$), as indicated by arrow 704. Optionally, device 510B also authenticates itself to the key management server 600. Thus, device 510B relays the request of device 510A along with its own Short-Term Ticket Granting Ticket, which is information sufficient to enable the key management service 600 to construct a service ticket that can be shared by devices 510A, 510B in later communications ("Shared Service Ticket" or $TKT_{A,B}$).

As shown by arrow 706, key management server 600 replies with a Session Key for devices 510A, 510B (designated $K_{A,B}$), encrypted using the key in the Short-Term Ticket Granting Ticket of device 510A that is shared among device 510A and a ticket granting server component of key management server 600. Thus, key management server 600 provides $\{K_{A,B}\} TGT_A$. Also as part of the message flow of arrow 706, key management server 600 provides the Shared Service Ticket $TKT_{A,B}$, which contains the Session Key encrypted using the key in the Short-Term Ticket Granting Ticket of device 510B that is shared by the ticket granting server and device 510B. Thus, key management server provides $\{K_{A,B}\} TGT_B$. As a result, both device 510A and device 510B can determine the session key by decrypting it using their respective shared secret keys that are shared with the key management server.

As shown by arrow 708, device 510B receives the reply of key management server 600 with $TKT_{A,B}$, and forwards the reply to device 510A. Prior to forwarding the reply, device 510B can also authenticate to device 510A by proving knowledge of the Session Key.

Device 510A then caches the Shared Service Ticket $TKT_{A,B}$ and authenticates to device 510B, as shown by arrow 710, by proving knowledge of $K_{A,B}$ and sending $TKT_{A,B}$ to device 510B. As a result of the foregoing steps, both peers possess a Session Key and are authenticated to one another.

2.5 Subsequent Peer-to-Peer Security

Subsequent peer-to-peer security phase 320 comprises authentication flows among peer devices that wish to communicate one or more messages. Because the initiating peer has cached a shared service ticket applicable to the other peer, the peers exchange only two messages to obtain mutual authentication and the establishment of a session key.

Figure 8:
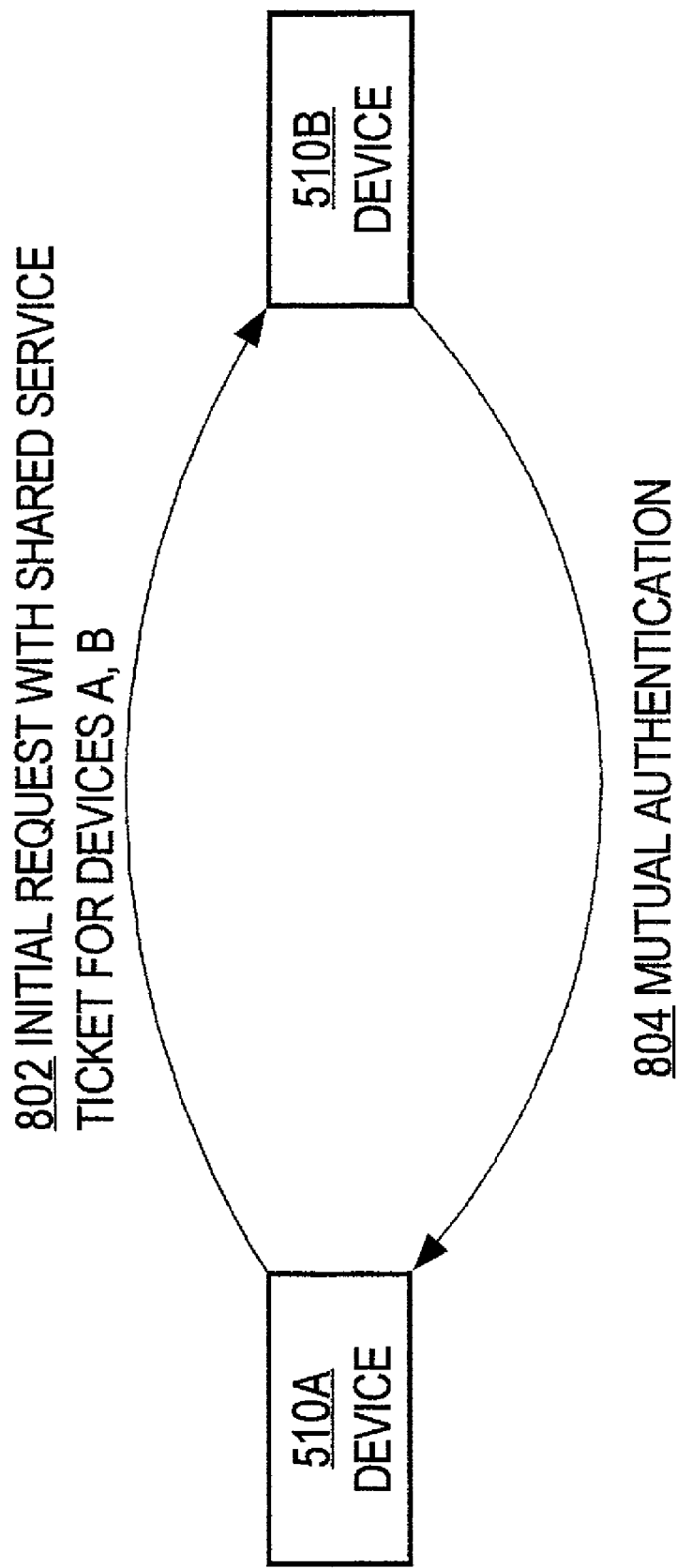
FIG. 8 is a block diagram of one approach for subsequent peer-to-peer security.

FIG. 8 is a block diagram of one approach for subsequent peer-to-peer security. Device 510A sends an initial application message or request to device 510B, and proves knowledge of the Session Key in the Shared Service Ticket $TKT_{A,B}$, as indicated by arrow 802. In a response message, as shown by arrow 804, device 510B mutually authenticates to device 510A by also proving knowledge of the Session Key.

After completing such mutual authentication, the peers are prepared to communicate securely by encrypting and decrypting using the Session Key. Thus, each peer uses the Session Key to encrypt its communications to the other peer. Upon receipt, the other peer decrypts the communications using the same Session Key.

3.0 Group Keying and Other Extensions

The architecture described herein eases the deployment of distributed key management servers by removing the need for public key operations and by removing the need for replicating and securing key databases. This enables a key management server to be deployed as a blade within a network device, for example, although, the key management server is still treated as a trusted security component.

All key servers within the same administrative realm may share group keys, which are keys that are used to decrypt device TGTs and to decrypt normal TGTs. Furthermore, all key management servers are themselves principals within a security realm, and therefore, are provided with individual service keys. Thus, the realm of key management servers defines a separate administrative domain having a higher-level key manager that maintains the group keys. In general, the same architecture used for managing device keys may be used for managing the key servers themselves.

In an alternative embodiment, the foregoing mechanisms may be implemented in a lighter-weight version that uses the same communication flows described herein, but does not use Kerberos encoding. To accomplish this, for example, ASN.1 encoding of the communication flows may be removed, and the message payloads may be changed. In this alternative, a smaller quantity of executable code can be achieved along with smaller message sizes. Additionally, group key management may be to address group keying of key management servers, and to the use of these same key management servers for group keying of applications such as event bus messaging.

4.0 Hardware Overview

Figure 9:
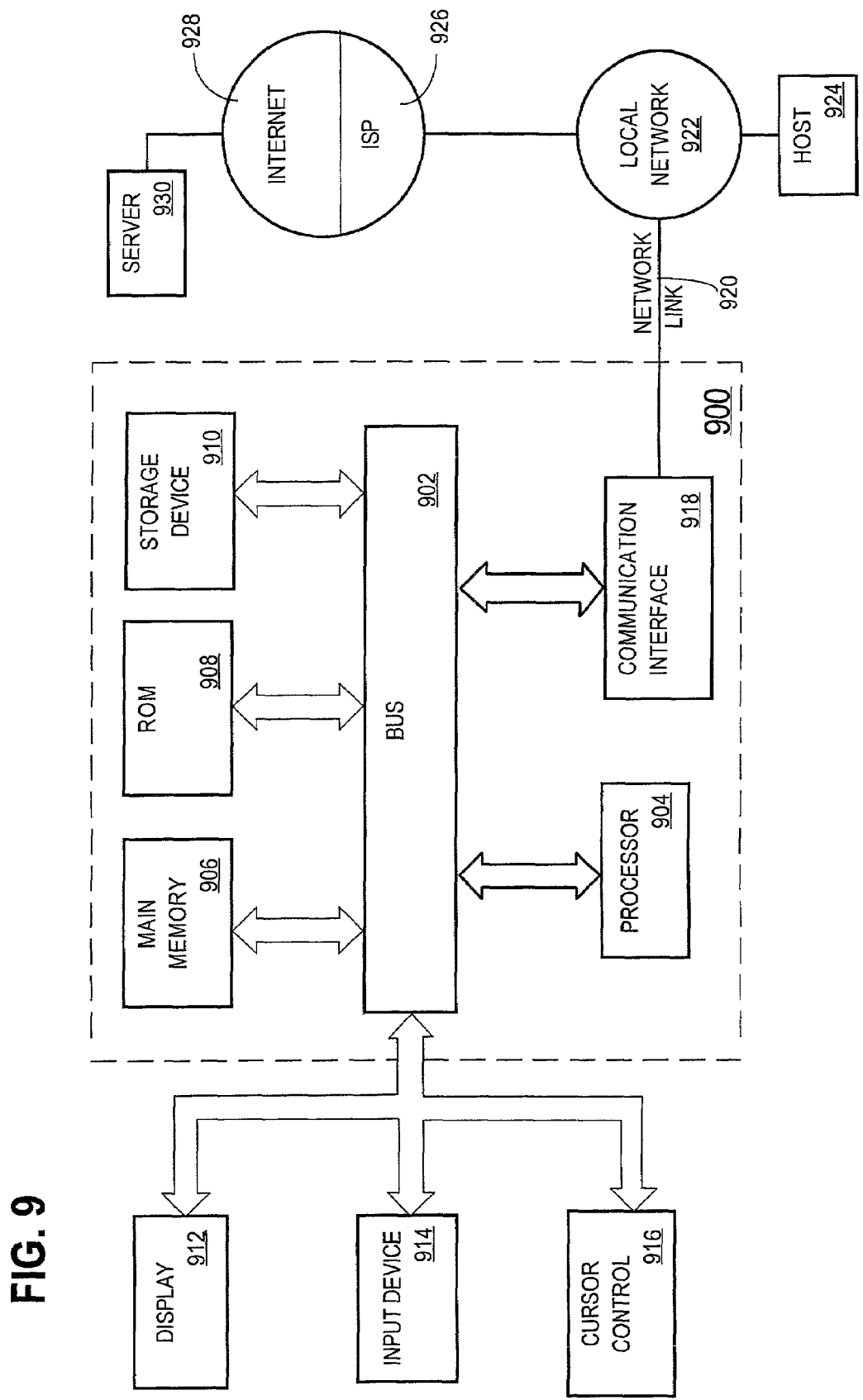
FIG. 9 is a block diagram that illustrates a computer system upon which an embodiment may be implemented.

FIG. 9 is a block diagram that illustrates a computer system 900 upon which an embodiment of the invention may be implemented. In general, the techniques described herein may be implemented, in one embodiment, in the form of one or more computer programs, sub-programs, processes, routines, classes, or other programmatic elements that are executed by a general-purpose digital computer. Alternatively, the programmatic elements may be executed by a special-purpose processor such as a network router, switch, gateway, etc. Keys and other information identified in this description may be implemented in the form of data values that are created and stored, transiently or persistently, in one or more computer-readable media as such are defined herein, and that are accessible to the programmatic elements. In still another alternative, the functions described herein may be implemented in one or more hardware elements such as integrated circuits and keys and other information may be stored in registers or other hardware storage elements.

Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for distributing cryptographic keys in a network. According to one embodiment of the invention, distributing cryptographic keys in a network is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for distributing cryptographic keys in a network as described herein.

The received code may be executed by processor 904 as it is received, and/or stored in storage device 910, or other non-volatile storage for later execution. In this manner, computer system 900 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of registering a non-configured network device in a telecommunications network, the method comprising the computer-implemented steps of:

providing, using a secure communication channel, information identifying a trusted device registration service to a first non-configured network packet-routing device for use in obtaining a longer-lived symmetric key;

providing trusted information to the trusted device registration service that certifies that the first device is a known device within a security realm;

authenticating the first device to the trusted device registration service;

registering the first device in the network at the trusted device registration service, wherein the trusted device registration service establishes a longer-lived symmetric key and provides the first device with the longer-lived symmetric key, and wherein the longer-lived symmetric key is valid until a subsequent registering of the first device at the trusted registration service;

receiving a message from the first device that requests network services, wherein the message from the first device contains the longer-lived symmetric key;

authenticating the first device based on the longer-lived symmetric key;

generating and providing a shorter-lived symmetric key to the first device based on authenticating the longer-lived symmetric key, wherein the shorter-lived symmetric key is valid no longer than a period during which the longer-lived symmetric key is valid;

receiving a request from a second network packet routing device to obtain a session key for secure communications between the second device and the first device, wherein the second device sends the request in response to receiving a request from the first device to obtain a session key on behalf of both the first device and the second device;

authenticating the request from the second device based on authenticating the shorter-lived symmetric key of the first device, wherein the request from the second device includes the shorter-lived symmetric key of the first device; and generating and providing a symmetric session key to the second device for use in subsequent secure peer-to-peer communications between the first device and the second device, wherein the first device obtains the symmetric session key from the second device without communication of the first device to a key management service or authoritative authentication service.

2. A method as recited in claim 1, wherein the shorter-lived symmetric key is encapsulated in a ticket that includes data identifying a specified lifetime of the shorter-lived symmetric key.

3. A method as recited in claim 1, wherein the subsequent secure communications comprise successive symmetric encryption and decryption operations using the symmetric session key, and wherein the first device and second device carry out the subsequent secure communications without contact with a key management service or registration service.

4. A method of distributing cryptographic keys in a network, the method comprising the computer-implemented steps of:

providing, using a secure communication channel, a registration service identifier that identifies an administrative entity to a first non-configured network packet routing device;

providing a unique identifier of the first device to the administrative entity;

associating a device public key with the first device in a secure data repository that is accessible by the administrative entity;

authenticating the first device to the administrative entity based on the device public key associated with the first device;

establishing a longer-lived symmetric key for the first device, and wherein the longer-lived symmetric key is valid until a subsequent registering of the first device at the trusted registration service;

authenticating the first device based on receiving the longer-lived symmetric key from the first device;

generating and providing a short-term symmetric key to the first device based on authenticating the longer-lived symmetric key, wherein the shorter-lived symmetric key is valid no longer than a period during which the longer-lived symmetric key is valid;

receiving a request from a second network packet routing device to obtain a session key for secure communications between the second device and the first device, wherein the second device sends the request in response to receiving a request from the first device to obtain a session key on behalf of both the first device and the second device;

authenticating the request from the second device based on authenticating the shorter-lived symmetric key of the first device, wherein the request from the second device includes the shorter-lived symmetric key of the first device; and generating and providing a symmetric session key to the second device for use in subsequent secure peer-to-peer communications between the first device and the second device, wherein the first device obtains the symmetric session key from the second device without communication of the first device to a key management service or authoritative authentication service.

5. A method as recited in claim 4, wherein the step of associating a device public key with the first device in the secure data repository comprises the steps of generating a public key pair comprising a device public key and a device private key and storing the device public key in a database or directory that is accessible to the administrative entity.

6. A method as recited in claim 5, wherein establishing a longer-lived symmetric key comprises the steps of:
generating the longer-lived symmetric key;
encrypting the longer-lived symmetric key using the device public key,
encapsulating the encrypted longer-lived symmetric key in a device registration ticket; and
sending the device registration ticket to the device.

7. A method as recited in claim 6, wherein encapsulating the encrypted key comprises encapsulating the encrypted longer-lived symmetric key with policy information in the device registration ticket, wherein the policy information defines a validity interval of the encrypted longer-lived symmetric key.

8. A method as recited in claim 4, wherein the stop of associating a device public key with the first device in the secure data repository comprises the steps of generating a public key pair comprising a device public key and a device private key and registering the device public key with a certification authority that is accessible to the administrative entity.

9. A method as recited in claim 4, wherein providing a unique identifier of the first device to the administrative entity comprises the steps of creating and storing an association of a unique identifier of the first device and the device public key in a secure database that is accessible to the administrative entity.

10. A method as recited in claim 4, wherein generating and providing a short-term symmetric key to the first device includes the steps of encapsulating the short-term symmetric key in a short-term ticket granting ticket with associated policy information.

11. A method as recited in claim 4, wherein the step of receiving a request from a second device to obtain a session key for secure communications among the second device and the first device comprises the steps of:
receiving a first short-term ticket granting ticket that includes the short-term symmetric key of the first device;
receiving a second short-term ticket granting ticket that includes the short-term symmetric key of the second dice;
decrypting the first and second short-term ticket granting tickets based on respective first and second shared secret keys;
authenticating the short-term symmetric keys of the first device and second device based on the respective first and second shared secret keys; and
generating and providing a symmetric session key to the second device for use in subsequent secure peer-to-peer communications between the first device and the second device without communication of the first device to a key management service or authoritative authentication service.

12. A method of establishing secure cryptographic peer-to-peer communication between a first network packet routing device and a second network packet routing device in a network, the method comprising the computer-implemented steps of:
providing a unique identifier of the first device to administrative entity and receiving in response, through a secure communication channel, a registration service identifier that identifies an administrative entity to the first device;
creating and storing a device public key associated with the first device in a secure data repository that is accessible by the administrative entity;
authenticating the first device to the administrative entity by sending a message from the first device to the administrative entity that is encrypted using the device public key;
receiving a longer-lived symmetric key for the first device, and wherein the longer-lived symmetric key is valid until a subsequent registering of the first device at the trusted registration service;
authenticating the first device to a key management server using the longer-lived symmetric key of the first device;
receiving a short-term symmetric key from the key management server, based on authenticating the longer-lived symmetric key, wherein the shorter-lived symmetric key is valid no longer than a period during which the longer-lived symmetric key is valid;
generating a request to a second device to obtain a session key for secure communications among the second device and the first device, based on authenticating the short-term symmetric key, wherein the request includes the short-term symmetric key of the first device; and
receiving a symmetric session key from the second device for use in subsequent secure peer-to-peer communications between the first device and the second device without communication of the first device to a key management service or authoritative authentication service.

13. A method as recited in claim 12, wherein the steps of creating and storing a device public key associated with the first device in a secure data repository comprises the steps of generating a public key pair comprising a device public key and a device private key and storing the device public key in a database or directory that is accessible to the administrative entity.

14. A method as recited in claim 13, wherein receiving a longer-lived symmetric key comprises the steps of receiving a device registration ticket that comprises the longer-lived symmetric key encrypted using the device public key.

15. A method as recited in claim 14, wherein the encrypted longer-lived symmetric key is encapsulated in the device registration ticket with policy information that defines a validity interval of the encrypted longer-lived symmetric key.

16. A method as recited in claim 12, wherein the steps of creating and storing a device public key associated with the first device in a secure data repository comprises the steps of generating a public key pair comprising a device public key and a device private key and registering the device public key with a certification authority that is accessible to the administrative entity.

17. A method as recited in claim 12, wherein providing information to a registration service that the first device is a certified device comprises the steps of creating and storing an association of a unique identifier of the first device and the device public key in a secure database that is accessible to the registration service, and providing the unique identifier from the first device to the registration service.

18. A method as recited in claim 12, wherein receiving the short-term symmetric key comprises the steps of receiving the abort-term symmetric key in a short-term ticket granting ticket with associated policy information.

19. A method as recited in claim 12, wherein the step of generating a request from a second device to obtain a session key for secure communications among the second device and the first devices comprises the steps of generating a first short-term ticket granting ticket that includes the short-term symmetric key of the first device.

20. A method as recited in claim 12, wherein the step of receiving a symmetric session key from the second device for use in subsequent secure peer-to-peer communications between the first device and the second device comprises receiving a shared service ticket that contains the symmetric session key.

21. A method as recited in claim 20, further comprising the steps of
generating an initial request for peer-to-peer secure communication, wherein the initial request is directed to the second device and includes the shared service ticket;
authenticating the second device based on the symmetric session key in the shared service ticket;
communicating one or more messages to the second device using the symmetric session key to encrypt or decrypt the messages.

22. A computer-readable storage medium carrying one or more sequences of instructions for distributing cryptographic keys in a network, which instructions, when executed by one or more processors, cause the one or more processors to carry out the steps of:
providing, using a secure communication channel, a registration service identifier that identifies an administrative entity to a first non-configured network packet routing device;
providing a unique identifier of the first device to the administrative entity;
associating a device public key with the first device in a secure data repository that is accessible by the administrative entity;
authenticating the first device to the administrative entity based on the device public key associated with the first device;
establishing a longer-lived symmetric key for the first device, and wherein the longer-lived symmetric key is valid until a subsequent registering of the first device at the trusted registration service;
authenticating the first device based on receiving the longer-lived symmetric key from the first device;
generating and providing a short-term symmetric key to the first device based on authenticating the longer-lived symmetric key, wherein the shorter-lived symmetric key is valid no longer than a pod during which the longer-lived symmetric key is valid;
receiving a request from a second network packet routing device to obtain a session key for secure communications between the second device and the first device, wherein the second device sends the request in response to receiving a request from the first device to obtain a session key on behalf of both the first device and the second device;
authenticating the request from the second device based on authenticating the shorter-lived symmetric key of the first device, wherein the request from the second device includes the shorter-lived symmetric key of the first device; and
generating and providing a symmetric session key to the second device for use in subsequent secure peer-to-peer communications between the first device and the second device without communication of the first device to a key management service or authoritative authentication service.

23. An apparatus for distributing cryptographic keys in a network, comprising:
means for providing, using a secure communication channel, a registration service identifier that identifies an administrative entity to a first non-configured network packet rout device;
means for providing a unique identifier of the first device to the administrative entity;
means for associating a device public key with the first device in a secure data repository that is accessible by the administrative entity;
means for authenticating the first device to the administrative entity based on the device public key associated with the first device;
means for establishing a longer-lived symmetric key for the first device, and wherein the longer-lived symmetric key is valid until a subsequent registering of the first device at the trusted registration service;
means for authenticating the first device based on receiving the longer-lived symmetric key from the first device;
means for generating and providing a short-term symmetric key to the first device based on authenticating the longer-lived symmetric key, wherein the shorter-lived symmetric key is valid no longer than a period during which the longer-lived symmetric key is valid;
means for receiving a request from a second network packet routing device to obtain a session key for secure communications between the second device and the first device, wherein the second device sends the request in response to receiving a request from the first device to obtain a session key on behalf of both the first device and the second device;
means for authenticating the request from the second device based on authenticating the shorter-lived symmetric key of the first device, wherein the request from the second device includes the shorter-lived symmetric key of the first device; and means for generating and providing a symmetric session key to the second device for use in subsequent secure peer-to-peer communications between the first device and the second device, wherein the first device obtains the symmetric session key from the second device without communication of the first device to a key management service or authoritative authentication service.

24. An apparatus as recited in claim 23, wherein the shorter-lived symmetric key is encapsulated in a ticket that includes data identifying a specified lifetime of the shorter-lived symmetric key.

25. An apparatus as recited in claim 23, wherein the subsequent secure communications comprise successive symmetric encryption and decryption operations using the symmetric session key, and wherein the first device and second device carry out the subsequent secure communications without contact with a key management service or registration service.

26. An apparatus as recited in claim 23, wherein the means for associating a device public key with the first device in the secure data repository comprises means for generating a public key pair comprising a device public key and a device private key and storing the device public key in a database or directory that is accessible to the administrative entity.

27. An apparatus as recited in claim 26, wherein the means for establishing a longer-lived symmetric key comprises:
   means for generating the longer-lived symmetric key;
   means for encrypting the longer-lived symmetric key using the device public key;
   means for encapsulating the encrypted longer-lived symmetric key in a device registration ticket; and
   means for sending the device registration ticket to the device.

28. An apparatus as recited in claim 27, wherein the means for encapsulating the encrypted key comprises means for encapsulating the encrypted longer-lived symmetric key with policy information in the device registration ticket, wherein the policy information defines a validity interval of the encrypted longer-lived symmetric key.

29. An apparatus as recited in claim 23, wherein the means for associating a device public key with the first device in the secure data repository comprises means for generating a public key pair comprising a device public key and a device private key and registering the device public key with a certification authority that is accessible to the administrative entity.

30. An apparatus as recited in claim 23, wherein the means for providing a unique identifier of the first device to the administrative entity comprises means for creating and storing an association of a unique identifier of the first device and the device public key in a secure database that is accessible to the administrative entity.

31. An apparatus as recited in claim 23, wherein the means for generating and providing a short-term symmetric key to the first device includes means for encapsulating the short-term symmetric key in a short-term ticket granting ticket with associated policy information.

32. An apparatus as recited in claim 23, wherein the means for receiving a request from a second device to obtain a session key for secure communications among the second device and the first device comprises:
   means for receiving a first short-term ticket granting ticket that includes the short-tem symmetric key of the first device;
   means for receiving a second short-term ticket granting ticket that includes the short-term symmetric key of the second device;
   means for decrypting the first and second shot-term ticket granting tickets based on respective first and second shared secret keys;
   means for authenticating the short-term symmetric keys of the first device and second device based on the respective first and second shared secret keys; and
   means for generating and providing a symmetric session key to the second device for use in subsequent secure peer-to-peer communications between the first device and the second device without communication of the first device to a key management service or authoritative authentication service.

33. An apparatus for distributing cryptographic keys in a data network, comprising:
   a network interface that is coupled to the data network for receiving one or more packet flows therefrom;
   a processor;
   one or more stored sequences of instructions which, when executed by the processor, cause the processor to carry out the steps of:
   providing, using a secure communication channel, a registration service identifier that identifies an administrative entity to a first non-configured network packet routing device;
   providing a unique identifier of the first device to the administrative entity;
   associating a device public key with the first device in a secure data repository that is accessible by the administrative entity;
   authenticating the first device to the administrative entity based on the device public key associated with the first device;
   establishing a longer-lived symmetric key for the first device, and wherein the longer-lived symmetric key is valid until a subsequent registering of the first device at the trusted registration service;
   authenticating the first device based on receiving the longer-lived symmetric key from the first device;
   generating and providing a short-term symmetric key to the first device based on authenticating the longer-lived symmetric key, wherein the shatter-lived symmetric key is valid no longer than a period during which the longer-lived metric key is valid;
   receiving a request from a second network packet routing device to obtain a session key for secure communications between the second device and the first device, wherein the second device sends the request in response to receiving a request from the first device to obtain a session key on behalf of both the first device and the second device;
   authenticating the request from the second device based on authenticating the shorter-lived symmetric key of the first device, wherein the request from the second device includes the shorter-lived symmetric key of the first device; and
   generating and providing a symmetric session key to the second device for use in subsequent secure peer-to-peer communications between the first device and the second device, wherein the first device obtains the symmetric session key from the second device without communication of the first device to a key management service or authoritative authentication service.

34. An apparatus as recited in claim 33, wherein the shorter-lived symmetric key is encapsulated in a ticket that includes data identifying a specified lifetime of the shorter-lived symmetric key.

35. An apparatus as recited in claim 33, wherein the subsequent secure communications comprise successive symmetric encryption and decryption operations using the symmetric session key, and wherein the first device and second device carry out the subsequent secure communications without contact with a key management service or registration service.

36. An apparatus as recited in claim 33, wherein the one or more stored sequences of instructions that cause the processor to perform associating a device public key with the first device in the secure data repository comprise instructions which when executed cause generating a public key pair comprising a device public key and a device private key and storing the device public key in a database or directory that is accessible to the administrative entity.

37. An apparatus as recited in claim 36, wherein the one or more stored sequences of instructions that cause the processor to perform establishing a longer-lived symmetric key comprise:
   instructions which when executed cause generating the longer-lived symmetric key;
   instructions which when executed cause encrypting the longer-lived symmetric key using the device public key;
   instructions which when executed cause encapsulating the encrypted longer-lived symmetric key in a device registration ticket; and
   instructions which when executed cause sending the device registration ticket to the device.

38. An apparatus as recited in claim 37, wherein the one or more stored sequences of instructions that cause the processor to perform encapsulating the encrypted key comprise instructions which when executed cause encapsulating the encrypted longer-lived symmetric key with policy information in the device registration ticket, wherein the policy information defines a validity interval of the encrypted longer-lived symmetric key.

39. An apparatus as recited in claim 33, wherein the one or more stored sequences of instructions that cause the processor to perform associating a device public key with the first device in the secure data repository comprise instructions which when executed cause generating a public key pair comprising a device public key and a device private key and registering the device public key with a certification authority that is accessible to the administrative entity.

40. An apparatus as recited in claim 33, wherein the one or more stored sequences of instructions that cause the processor to perform providing a unique identifier of the first device to the administrative entity comprise instructions which when executed cause creating and storing an association of a unique identifier of the first device and the device public key in a secure database that is accessible to the administrative entity.

41. An apparatus as recited in claim 33, wherein the one or more stored sequences of instructions that cause the processor to perform generating and providing a short-term symmetric key to the first device include instructions which when executed cause encapsulating the short-term symmetric key in a short-term ticket granting ticket with associated policy information.

42. An apparatus as recited in claim 33, wherein the one or more stored sequences of instructions that cause the processor to perform receiving a request from a second device to obtain a session key for secure communications among the second device and the first device case:
   instructions which when executed cause receiving a first short-term ticket granting ticket that includes the short-term symmetric key of the first device;
   instructions which when executed cause receiving a second short-term ticket granting ticket that includes the short-term symmetric key of the second device;
   instructions which when executed cause decrypting the first and second short-term ticket granting tickets based on respective first and second shared secret keys;
   instructions which when executed cause authenticating the short-term symmetric keys of the first device and second device based on the respective first and second shared secret keys; and
   instructions which when executed cause generating and providing a symmetric session key to the second device for use in subsequent secure peer-to-peer communications between the first device and the second device without communication of the first device to a key management service or authoritative authentication service.

* * * * *

UNITED STATES PATENT AND TRADEMARK OFFICE
CERTIFICATE OF CORRECTION

PATENT NO. : 7,181,620 B1
APPLICATION NO. : 10/008053
DATED : February 20, 2007
INVENTOR(S) : Matthew Hur It is certified that error appears in the above-identified patent and that said Letters Patent is hereby corrected as shown below:

In column 21, line 48, replace "stop" with --step--;

In column 22, line 8, replace "dice" with --device--;

In column 23, line 31, replace "devices" with --device--.

In column 23, line 41, replace "of" with --of:--;

In column 24, line 10, replace "pod" with --period--;

In column 24, line 35, replace "rout" with --routing--.

Signed and Sealed this

Twenty-fifth Day of December, 2007

JON W. DUDAS
*Director of the United States Patent and Trademark Office*